(12) United States Patent
Bae et al.

(10) Patent No.: US 11,709,930 B2
(45) Date of Patent: Jul. 25, 2023

(54) INFERRING WATCHPOINTS FOR UNDERSTANDABLE TAINT REPORTS

(71) Applicant: Oracle International Corporation, Redwood Shores, CA (US)

(72) Inventors: Sora Bae, Carindale (AU); Francois Gauthier, Brisbane (AU); Alexander Jordan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 545 days.

(21) Appl. No.: 15/930,162

(22) Filed: May 12, 2020

(65) Prior Publication Data

US 2021/0360005 A1 Nov. 18, 2021

(51) Int. Cl.
*G06F 21/54* (2013.01)
*G06N 5/04* (2023.01)
(Continued)

(52) U.S. Cl.
CPC .......... *G06F 21/54* (2013.01); *G06F 11/3604* (2013.01); *G06F 11/3636* (2013.01); *G06F 21/577* (2013.01); *G06N 5/04* (2013.01)

(58) Field of Classification Search
CPC ....... G06F 21/54; G06F 11/3604–3616; G06F 11/362; G06F 11/3636; G06N 5/04
(Continued)

(56) References Cited

U.S. PATENT DOCUMENTS

| | | | | |
|---|---|---|---|---|
| 6,308,324 B1 * | 10/2001 | Roediger | ............ | G06F 11/3466 712/240 |
| 8,127,360 B1 * | 2/2012 | Wilhelm | ............... | G06F 21/552 726/25 |
| 2019/0129826 A1 * | 5/2019 | Ramesh | ................ | G06F 21/577 |

FOREIGN PATENT DOCUMENTS

GB 2551972 A * 1/2018 ............ G06F 11/302

OTHER PUBLICATIONS

Chen, Peng, et al., Angora: Efficient Fuzzing by Principled Search, IEEE Symposium on Security and Privacy (SP), May 20-24, 2018, 15 pages, [retrieved on Oct. 19, 2022], Retrieved from the Internet: <URL:http://ieeexplore.ieee.org/>.*

(Continued)

*Primary Examiner* — Geoffrey R St Leger
(74) *Attorney, Agent, or Firm* — Ferguson Braswell Fraser Kubasta PC (57) ABSTRACT

A taint report represents a taint flow from a source value at a source program point to a sink value at a sink program point. Candidate watchpoints that correspond to taint-like values similar to the source value may be inferred from an execution trace. Different subsets of candidate watchpoints represent solutions to the problem of determining an optimal subset of watchpoints contributing to a taint flow. Using a hill-climbing heuristic, incremental improvements are efficiently applied to a solution until no more improvements are found. An objective function may determine whether one solution improves another solution. The objective function may be based on validity, understandability, and perfor- (Continued)

mance. Validity favors candidate watchpoints that reduce the edit distance between the source and sink values. Understandability favors candidate watchpoints included in a call chain from the source program point to the sink program point. Performance favors small subsets of candidate watchpoints.

17 Claims, 7 Drawing Sheets

(51) Int. Cl.
    *G06F 11/36* (2006.01)
    *G06F 21/57* (2013.01)

(58) Field of Classification Search
    USPC .............................. 717/127, 128, 130, 131
    See application file for complete search history.

(56) References Cited

OTHER PUBLICATIONS

Naderi-Afooshteh, Abbas, et al., Joza: Hybrid Taint Inference for Defeating Web Application SQL Injection Attacks, 45th Annual IEEE/IFIP International Conference on Dependable Systems and Networks, 2015, 12 pages, [retrieved on Oct. 19, 2022], Retrieved from the Internet: <URL:http://ieeexplore.ieee.org/>.*

Agrawal, Hiralal et al., "Debugging with Dynamic Slicing and Backtracking"; Software-Practice & Experience; vol. 23, Issue 6; pp. 589-616; Jun. 1993 (29 pages).

Agrawal, Hiralal et al., "Dynamic Program Slicing"; ACM SIGPLAN Notices; vol. 25, Issue 6; pp. 246-256; Jun. 1990 (11 pages).

Chibotaru, Victor et al., "Scalable Taint Specification Inference with Big Code"; PLDI 2019: Proceedings of the 40th ACM SIGPLAN Conference on Programming Language Design and Implementation; pp. 760-774; Jun. 2019 (15 pages).

Clause, James et al., "LEAKPOINT: Pinpointing the Causes of Memory Leaks"; ICSE '10: Proceedings of the 32nd ACM/IEEE International Conference on Software Engineering; pp. 515-524; May 2-8, 2010 (10 pages).

Madsen, Magnus et al., "Feedback-Directed Instrumentation for Deployed JavaScript Applications"; ICSE '16: Proceedings of the 38th International Conference on Software Engineering; pp. 899-910; May 14-22, 2016 (12 pages).

Masri, Wes et al., "Detecting and Debugging Insecure Information Flows"; 15th International Symposium on Software Reliability Engineering; pp. 198-209; Nov. 2004 (12 pages).

Sridharan, Manu et al., "Thin slicing"; PLDI '07: Proceedings of the 28th ACM SIGPLAN Conference on Programming Language Design and Implementation; pp. 112-122; Jun. 11-13, 2007 (11 pages).

Tripp, Omer et al., "TAJ: effective taint analysis of web applications"; PLDI '09: Proceedings of the 30th ACM SIGPLAN Conference on Programming Language Design and Implementation; pp. 87-97; Jun. 15-20, 2009 (11 pages).

Ye, Jiabin et al., "Efficient and Precise Dynamic Slicing for Client-Side JavaScript Programs"; 2016 IEEE 23rd International Conference on Software Analysis, Evolution, and Reengineering (SANER); pp. 449-459; Mar. 2016 (11 pages).

Zhang, Xiangyu et al., "Precise Dynamic Slicing Algorithms"; ISCE '03: Proceedings of the 25th International Conference on Software Engineering; pp. 319-329; May 2003 (11 pages).

* cited by examiner

INFERRING WATCHPOINTS FOR UNDERSTANDABLE TAINT REPORTS

BACKGROUND

Dynamic taint analysis tools have been developed and used to secure web applications, for example, from injection attacks. Injection attacks are known to be a major risk to web servers and may occur when untrusted, crafted data from attackers reach commands or queries on the server-side, allowing the execution of unintended commands or access to unauthorized data. Typical white-box taint analysis (e.g., based on wrapping and unwrapping on every operation) may require extensive modifications to the application and may increase performance overhead, and may be thus unscalable to real-world applications. In addition, white-box analysis relies on error-prone manual models (e.g., to model functions for which source code is unavailable).

In contrast, grey-box taint analysis analyzes selective operations and does not require extensive instrumentation or manual modeling, and is thus scalable to industrial web applications. However, while grey-box taint analysis is capable of revealing injection bugs in real-world applications, grey-box taint analysis lacks traceability, making its findings less understandable and less actionable. That is, grey-box taint reports do not identify the detailed flow of attacker-controlled data through the application. Without traceability, it is challenging for users to interpret or debug a reported bug, or even to determine if the bug is a true or false positive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, from an instrumented application executing on a web server: a taint report including a source value, and an execution trace including candidate watchpoints that access taint-like values similar to the source value, selecting a subset of the candidate watchpoints to obtain a selected subset, modifying the selected subset to obtain a modified subset of the candidate watchpoints, and determining, by applying an objective function to the selected subset and the modified subset, that the modified subset is an improvement to the selected subset.

In general, in one aspect, one or more embodiments relate to a system including a computer processor and an instrumenter executing on a web server and configured to instrument an application to generate a taint report including a source value and an execution trace including candidate watchpoints that access taint-like values similar to the source value. The system further includes a repository configured to store an objective function and a subset of the candidate watchpoints. The system further includes a watchpoint engine executing on the computer processor and configured to receive, from the instrumented application, the taint report and the execution trace, select the subset to obtain a selected subset, modify the selected subset to obtain a modified subset of the candidate watchpoints, and determine, by applying the objective function to the selected subset and the modified subset, that the modified subset is an improvement to the selected subset.

In general, in one aspect, one or more embodiments relate to a non-transitory computer readable medium including instructions that, when executed by a computer processor, perform receiving, from an instrumented application executing on a web server: a taint report including a source value, and an execution trace including candidate watchpoints that access taint-like values similar to the source value, selecting a subset of the candidate watchpoints to obtain a selected subset, modifying the selected subset to obtain a modified subset of the candidate watchpoints, and determining, by applying an objective function to the selected subset and the modified subset, that the modified subset is an improvement to the selected subset.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to inferring watchpoints for a taint report. A taint report represents a taint flow from a source value at a source program point in an application to a sink value at a sink program point in the application. A source program point is a program point where external input enters the application. A sink program point may be a program point where a security-sensitive resource is accessed. Candidate watchpoints that correspond to taint-like values similar to the source value may be inferred from an execution trace. A candidate watchpoint is a program point that is a candidate to include in a taint flow trace for the taint report. The taint flow trace includes a subset of candidate watchpoints that describes a possible taint flow. Each subset of candidate watchpoints represents a possible solution to the problem of determining an optimal subset of watchpoints that are likely to contribute to a taint flow for the taint report.

Heuristic strategies may be used to reduce the size of the search space to enable efficient computation of an approximate solution to the optimization problem. In one or more embodiments, a hill-climbing algorithm is used to search the space of possible solutions (i.e., the space of possible subsets of candidate watchpoints). Using the hill-climbing algorithm, a sequence of incremental improvements is applied to an initial solution until no more improvements are found. An objective function may be used to determine whether one solution represents an improvement to another solution. In one or more embodiments, the objective function combines three metrics: (1) validity, (2) understandability, and (3) performance. The validity metric may be designed to prefer subsets of candidate watchpoints that reduce the edit distance between the source value and the sink value. The understandability metric may be designed to prefer subsets of candidate watchpoints that are included in a call chain from the source program point to the sink program point. The performance metric may be designed to prefer subsets of candidate watchpoints that include a small number of candidate watchpoints.

The taint flow trace may be used to selectively instrument the application to perform the taint analysis by focusing the taint analysis on those modules that include watchpoints inferred in the taint flow trace. For example, web applications may dynamically load numerous large modules (e.g., libraries), not all of which are relevant to a taint analysis. Excluding modules that are irrelevant to the taint analysis improves the performance of the taint analysis.

Figure 1:
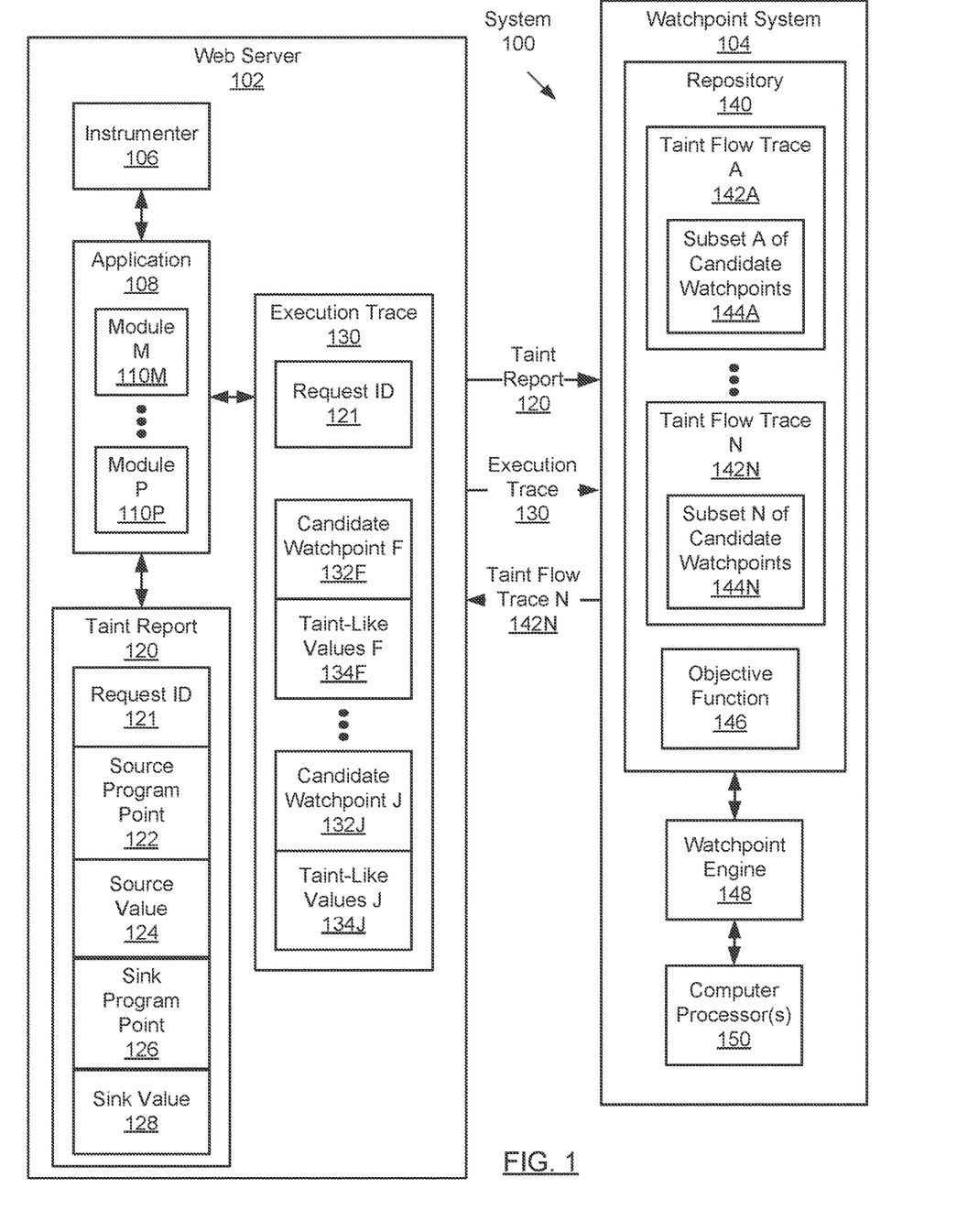
FIG. 1 and FIG. 2 show flow diagrams of a system in accordance with one or more embodiments of the invention.

FIG. 1 shows a system (100) in accordance with one or more embodiments of the invention. As shown in FIG. 1, the system (100) includes a web server (102) and a watchpoint system (104). In one or more embodiments, the web server (102) and/or the watchpoint system (104) take the form of the computing system (500) described with respect to FIG. 5A and the accompanying description below or take the form of the client device (526) described with respect to FIG. 5B.

In one or more embodiments, the web server (102) is a server for a specific website. The web server (102) may execute an application (108) (e.g., a web application). In one or more embodiments, the application (108) is a collection of source code including various software components. The application (108) may include statements written in a programming language, or intermediate representation (e.g., byte code). The application (108) may be transformed by a compiler into binary machine code. Compiled machine code may be executed by a computer processor (150) in order to execute software components generated from the application (108). The application (108) may be any collection of object code (e.g., machine code generated by a compiler) or another form of the application (108).

In one or more embodiments, the application (108) includes modules (110M, 110P). In one or more embodiments, a module (110M) (e.g., a library module) is an independent unit of source code. Programming entities defined within a module (110M) may be imported by other modules. For example, the programming entities may be functions, constructors, constants, variables, objects, etc.

The web server (102) may include an instrumenter (106). The instrumenter (106) is a software component that includes functionality to modify the application (108) to generate a taint report (120), an execution trace (130), and/or additional information regarding the execution and/or performance of the application (108). The instrumented application (108) may include functionality to send the taint report (120) and/or execution trace (130) to the watchpoint engine (148). The instrumenter (106) may include functionality to further instrument the application (108) using taint flow traces (142A, 142N) received from the watchpoint engine (148).

In one or more embodiments, a taint report (120) represents a taint flow from a source value (124) at a source program point (122) to a sink value (128) at a sink program point (126). In one or more embodiments, the taint report (120) corresponds to a request ID (121) of a specific request (e.g., a HyperText Transfer Protocol (HTTP) request) received by the application (108). For example, the application (108) may be instrumented to assign a request ID (121) to each request received by the application (108). The instrumenter (106) may include functionality to further instrument the application (108) to propagate the request ID (121) to function calls recorded in an execution trace (130).

A source program point (122) is a program point where external input enters the application (108). For example, the source program point (122) may be an input parameter of a function or a request. As another example, the source program point (122) may be a function that receives input from an external source. The source value (124) is the value received at the source program point (122). For example, the source value (124) may be a string designed by an attacker to execute a malicious command. A sink program point (126) may be a program point where a security-sensitive resource is accessed. For example, the sink program point (126) may be a function or statement that accesses a security-sensitive resource of a computer system (e.g., web server (102)) that executes the application (108). Continuing this example, the security-sensitive resource may be confidential data, privileged operating system instructions and/or memory segments, a security-sensitive operation such as the eval function, etc. The sink value (128) is the value received at the sink program point (126). For example, the sink value (128) may be equivalent to the source value (124). As another example, the sink value (128) may be the result of modifying the source value (124) by one or more instructions in the application (108). In other words, the source value (124) may be partially reflected in the sink value (128).

In one or more embodiments, the instrumented application (108) includes functionality to generate the taint report (120) by performing a taint analysis on a subset of the modules (110M, 110P) that include one or more program points corresponding to a taint configuration. That is, the taint analysis may be limited to the modules (110M, 110P) relevant to the taint configuration, thus reducing the computational complexity and improving the performance and efficiency of the taint analysis. The taint configuration includes program points that may contribute to a taint flow. For example, the taint configuration may include taint-sensitive operations, such as taint sources (e.g., where an attacker-controllable input enters the application (108)), taint sinks (e.g., where a security-sensitive operation, such as eval, is performed), and sanitizers. A sanitizer is a statement or function that transforms a potentially tainted value into a safe (e.g., trusted) value that is not associated with a taint flow. For example, a sanitizer may modify a value by encoding or replacing potentially dangerous characters with harmless equivalents. Continuing this example, the potentially dangerous characters may be filtered or escaped. The sanitizer may transform a source value (e.g., source value (124)), a sink value (e.g., sink value (128)), or an intermediate value generated from the source value and later used to generate the sink value.

In one or more embodiments, an execution trace (130) includes candidate watchpoints (132F, 132J) that correspond to taint-like values (134F, 134J). Each candidate watchpoint (132F) may correspond to one or more taint-like values. A candidate watchpoint (132F) is a program point in the application (108) that is a candidate to include in a taint flow trace (e.g., taint flow traces (142A, 142N)) for a taint report (120). In one or more embodiments, the execution trace (130) corresponds to a request ID (121) of a specific request received by the application (108). For example, the execution trace (130) may correspond to the same request ID (121) included in the taint report (120). Continuing this example, program points (e.g., function calls) corresponding to different request IDs may be recorded in different execution traces. Further continuing this example, when a program point does not correspond to a specific request, then the program point may be included in each execution trace, in order to ensure that all potentially relevant program points are considered as candidate watchpoints. Limiting the execution trace (130) to candidate watchpoints (132F, 132J) that correspond to taint-like values (134F, 134J) reduces the number of program points to consider (e.g., by excluding program points irrelevant to the taint report (120)) when searching the space of possible solutions to the watchpoint optimization problem described below, thus improving the efficiency of the search.

The candidate watchpoint (132F) may be a function call that accesses one or more taint-like values (134F). In one or more embodiments, a taint-like value (134F) is the value of an argument (e.g., an input parameter) passed to a function at a candidate watchpoint (132F). Alternatively, a taint-like value (134F) may be a return value (e.g., a value of an output parameter) returned by a function at a candidate watchpoint (132F). In one or more embodiments, the taint-like value (134F) is similar to the source value (124) when a value of similarity metric exceeds a predetermined threshold. The similarity metric may be based on an edit distance between the source value (124) and the taint-like value (134F). The edit distance may be based on various algorithms that calculate the distance between string values (e.g., the Levenshtein algorithm, longest common subsequence (LCS) algorithms, etc.). For example, the edit distance may be based on the longest common subsequence (LCS) in the source value (124) and the taint-like value (134F). The LCS is not required to occupy consecutive positions within the source value (124) and the taint-like value (134F). For example, the LCS of the strings "abdexz" and "acdyz" is "adz". The edit distance may be defined as the minimum number of insert and/or delete operations needed to derive the LCS. The insert and delete operations may be character-level string operations (e.g., such that inserting or deleting N characters is counted as N operations).

The candidate watchpoints (132F, 132J) may be arranged in a sequence. For example, the sequence may correspond to the order in which the candidate watchpoints (132F, 132J) (e.g., function calls) were executed.

Continuing with FIG. 1, in one or more embodiments, the watchpoint system (104) includes a repository (140), a watchpoint engine (148), and computer processor(s) (150). In one or more embodiments, the watchpoint engine (148) includes functionality to generate taint flow traces (142A, 142N) from a taint report (120) and an execution trace (130). The watchpoint engine (148) may include functionality to send the taint flow traces (142A, 142N) to the web server (102). The watchpoint engine (148) may include functionality to store the taint flow traces (142A, 142N) (e.g., instead of storing the taint flow traces (142A, 142N) in the repository (140)). The watchpoint engine (148) includes functionality to receive a taint report (120) and/or an execution trace (130) from the instrumented application (108).

In one or more embodiments, the repository (140) may be any type of storage unit and/or device (e.g., a file system, database, collection of tables, or any other storage mechanism) for storing data. Further, the repository (140) may include multiple different storage units and/or devices. The multiple different storage units and/or devices may or may not be of the same type or located at the same physical site.

In one or more embodiments, the repository (140) includes taint flow traces (142A, 142N) and an objective function (146). A taint flow trace (142A) includes a subset of candidate watchpoints (144A) that describes a possible taint flow corresponding to the taint report (120). Each subset of candidate watchpoints (144A, 144N) describes a taint flow from the source value (124) at the source program point (122) to the sink value (128) at the sink program point (126). Each subset of candidate watchpoints (144A, 144N) represents a possible solution to a watchpoint optimization problem, namely the problem of determining an optimal subset of candidate watchpoints that are most likely to contribute to a taint flow corresponding to the taint report (120). Because searching the space of possible solutions to an optimization problems is combinatorially complex, a heuristic strategy may be used to reduce the size of the search space to enable efficient computation of an approximate solution to the optimization problem. In one or more embodiments, a hill-climbing algorithm is used to search the space of possible solutions (i.e., the space of possible subsets of candidate watchpoints (144A, 144N)). Using the hill-climbing algorithm, a sequence of incremental improvements is applied to an initial solution until no more improvements are found.

Figure 2:
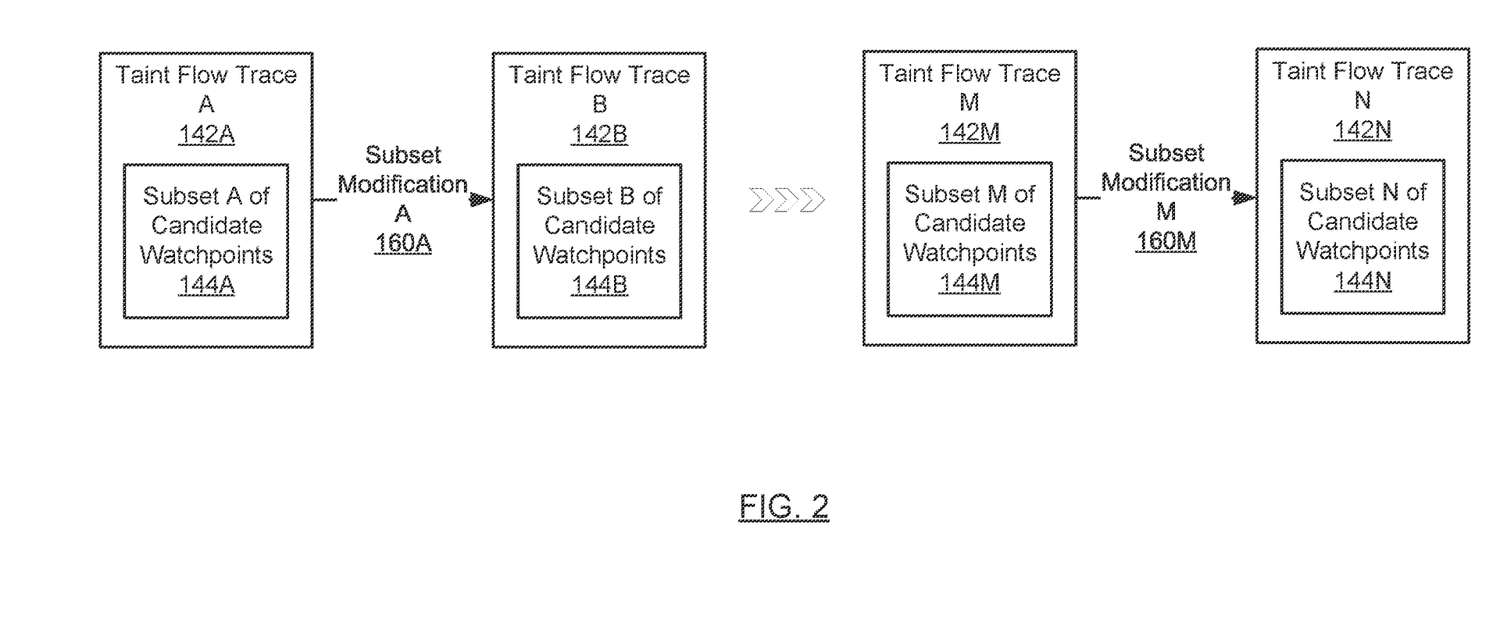

FIG. 2 shows an example of a sequence of incremental improvements applied to an initial solution, taint flow trace A (142A), which includes subset A of candidate watchpoints (144A). The result of applying subset modification A (160A) to subset A of candidate watchpoints (144A) is taint flow trace B (142B), which includes subset B of candidate watchpoints (144B). Taint flow trace B (142B) represents an improvement to taint flow trace A (142A), relative to the objective function (146). Additional subset modifications (i.e., improvements) are performed on successive taint flow traces. Finally, the result of applying subset modification M (160M) to subset M of candidate watchpoints (144M) is taint flow trace N (142N), which includes subset N of candidate watchpoints (144N). No further improvements are found for taint flow trace N (142N), so taint flow trace N (142N) is a solution to the watchpoint optimization problem.

The objective function (146) may be used to determine whether one solution represents an improvement to another solution. That is, the objective function (146) is a means for comparing different subsets of candidate watchpoints (144A, 144N). In one or more embodiments, the objective function (146) combines three different metrics: (1) validity, (2) understandability, and (3) performance. The validity metric may be designed to prefer subsets of candidate watchpoints (144A, 144N) that reduce the edit distance between the source value (124) and the sink value (128) of the taint report (120) because such subsets of candidate watchpoints (144A, 144N) indicate how the sink value (128) is derived from the source value (124). For example, if source value and sink value are AB and AB CD, respectively, a candidate watchpoint (132F) that observes ABC is preferred by the validity metric.

The understandability metric may be designed to prefer subsets of candidate watchpoints (144A, 144N) that are included in a call chain from the source program point (122) to the sink program point (126) because the call chain indicates a sequence of function calls that transform the source value (124) to the sink value (128). For example, if the source program point (122) passes the source value (124) to a function, and the function calls the sink program point (126), a subset of candidate watchpoints (144A) that includes the call to the function may be preferred.

The performance metric may be designed to prefer subsets of candidate watchpoints (144A, 144N) that include a small number of candidate watchpoints because too many candidate watchpoints degrade the performance of the taint analysis.

The algorithms to calculate the metrics of the objective function (146) are described in Step 208 below.

In one or more embodiments, the computer processor(s) (150) takes the form of the computer processor(s) (502) described with respect to FIG. 5A and the accompanying description below. In one or more embodiments, the computer processor (150) includes functionality to execute the watchpoint engine (148).

While FIG. 1 shows a configuration of components, other configurations may be used without departing from the scope of the invention. For example, various components may be combined to create a single component. As another example, the functionality performed by a single component may be performed by two or more components.

Figure 3:
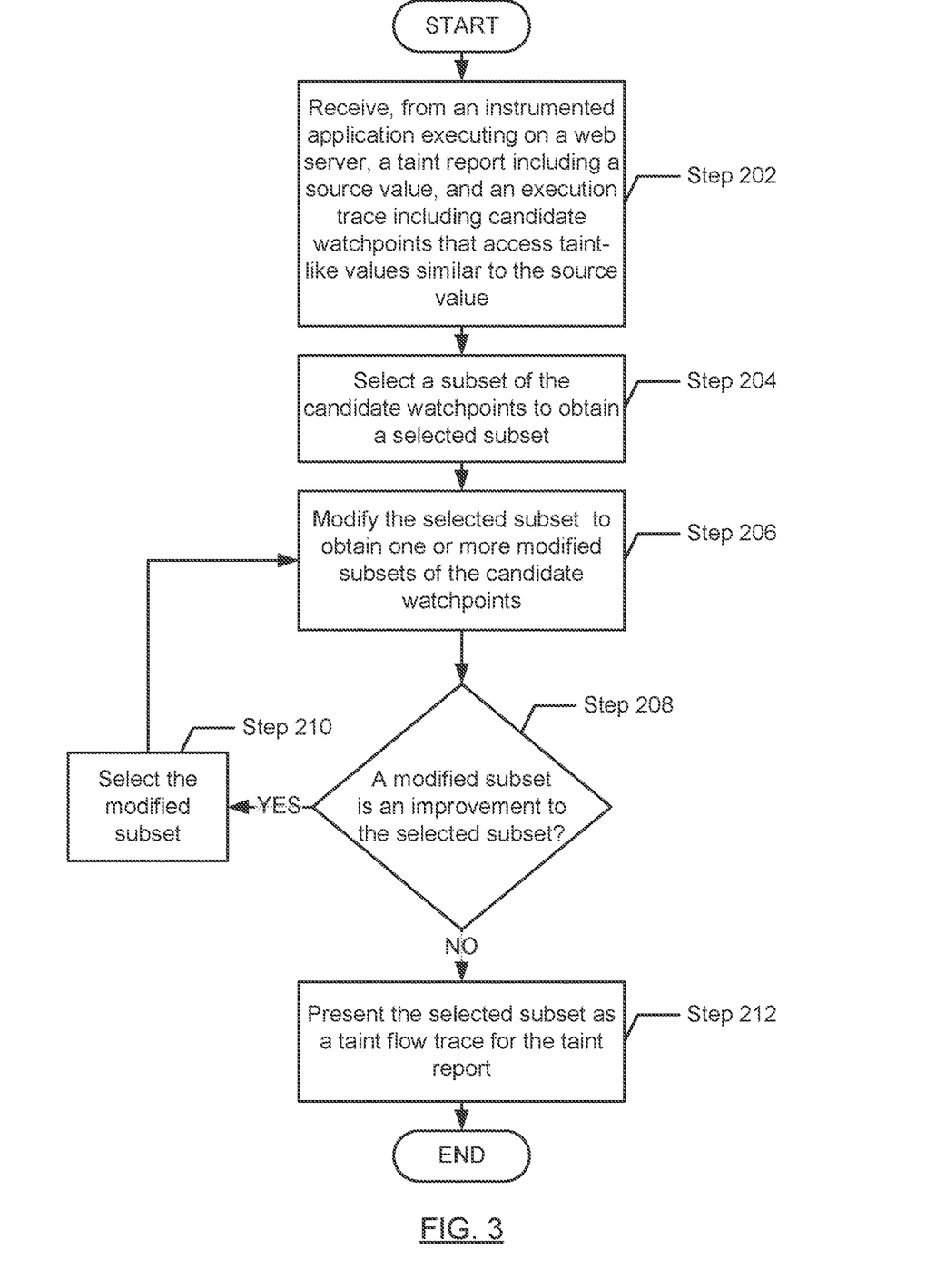
FIG. 3 shows a flowchart of a method in accordance with one or more embodiments of the invention.

FIG. 3 shows a flowchart in accordance with one or more embodiments of the invention. The flowchart depicts a process for inferring watchpoints. One or more of the steps in FIG. 3 may be performed by the components (e.g., the watchpoint engine (148) and the application (108) of the web server (102)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 202, a taint report including a source value, and an execution trace including candidate watchpoints are received from an instrumented application executing on a web server. In one or more embodiments, the instrumented application generates the taint report by performing a taint analysis on the modules of the instrumented application that include program points corresponding to a taint configuration. The taint configuration may include taint sources, taint sinks, and sanitizers.

The candidate watchpoints of the execution trace access taint-like values similar to the source value. For example, the taint-like values may be within a threshold value of a similarity metric relative to the source value. Continuing this example, the similarity metric may be based on an edit distance between the source value and the taint-like value.

In Step 204, a subset of the candidate watchpoints is selected to obtain a selected subset. The selected subset represents a starting point from which to explore the search space of possible candidate watchpoints to include in a taint flow trace for the taint report. The watchpoint engine may select a randomly generated subset of the candidate watchpoints. The candidate watchpoints in the selected subset may form a sequence based on the execution order of the candidate watchpoints in the execution trace.

The selected subset may be represented using a bit vector corresponding to the candidate watchpoints. For example, if there are N candidate watchpoints, then the bit vector has N bits each corresponding to one of the N candidate watchpoints. Continuing this example, if a candidate watchpoint is included in the selected subset, then the bit corresponding to the candidate watchpoint is set to 1. Alternatively, if the candidate watchpoint is excluded from the selected subset, then the bit corresponding to the candidate watchpoint is set to 0.

In Step 206, the selected subset of the candidate watchpoints is modified to obtain one or more modified subsets of the candidate watchpoints. That is, the watchpoint engine may modify the selected subset multiple times (e.g., in multiple parallel and/or sequential executions of Step 206) in order to search the space of possible subsets of the candidate watchpoints (e.g., in a breadth-first manner). Each modification may be an incremental modification to the selected subset. In one or more embodiments, the watchpoint engine modifies the selected subset by adding a candidate watchpoint to the selected subset. Adding the candidate watchpoint to the selected subset may correspond to toggling the bit in the bit vector corresponding to the candidate watchpoint from 0 to 1. Alternatively, the watchpoint engine may modify the selected subset by removing a candidate watchpoint from the selected subset. Removing the candidate watchpoint from the selected subset may correspond to toggling the bit in the bit vector corresponding to the candidate watchpoint from 1 to 0.

If, in Step 208 it is determined that a modified subset is an improvement to the selected subset, then in Step 210 the watchpoint engine selects the modified subset and again executes Step 206 above. For example, the watchpoint engine may add, to a pool, each modified subset that is an improvement to the selected subset. If the pool includes at least one modified subset, then the watchpoint engine may select a modified subset from the pool. For example, the watchpoint engine may select the modified subset corresponding to the highest objective function. Alternatively, the watchpoint engine may select the modified subset that was added to the pool first. In one or more embodiments, the watchpoint engine determines whether the modified subset is an improvement to the selected subset by applying an objective function to both the selected subset and the modified subset. The objective function may combine a validity metric, and understandability metric, and a performance metric. The watchpoint engine may calculate the validity metric for a subset (i.e., a sequence) of candidate watchpoints by:

1) calculating a maximum edit distance, $D_{max}$, between taint-like values of consecutive candidate watchpoints in the sequence of candidate watchpoints. First, the watchpoint engine calculates edit distances between the source value and each taint-like value of the first candidate watchpoint in the sequence of candidate watchpoints in order to find a taint-like value of the first candidate watchpoint that is "most similar" to the source value. The "most similar" taint-like value to the source value is the taint-like value of the first candidate watchpoint with the smallest edit distance relative to the source value. Next, the watchpoint engine calculates edit distances between the "most similar" taint-like value of the first candidate watchpoint and each taint-like value of the second candidate watchpoint in the sequence of candidate watchpoints, and so on, until the watchpoint engine calculates edit distances between the "most similar" taint-like value of the last candidate watchpoint in the sequence of candidate watchpoints and the sink value. A small maximum edit distance means that there are no large gaps in the edit distances between the taint-like values of consecutive candidate watchpoints in the sequence of candidate watchpoints. Thus, the transformation of the source value to the sink value occurs in small increments, which may correspond to a more useful and understandable taint flow trace.

2) calculating a total edit distance, $D_{total}$, by adding the edit distances between the aforementioned "most similar" taint-like values of candidate watchpoint in the sequence. A small total edit distance may correspond to a minimal, and thus more direct sequence of transformations from the source value to the sink value. That is, the sequence of transformations from the source value to the sink value may be less likely to include irrelevant transformations that add edit distance without making progress toward transforming the source value to the sink value, which may correspond to a more useful and understandable taint flow trace.

The value of the validity metric may then be derived from $D_{max}$ and $D_{total}$, normalized relative to the edit distance, $D_{source-to-sink}$, between the source value and the sink value without considering any candidate watchpoints. For example, the value of the validity metric, V, may be calculated using the following formula:

$$V = -D_{total}/D_{source-to-sink} * D_{max}/D_{source-to-sink}$$

The watchpoint engine may calculate the value of the understandability metric for a subset of candidate watchpoints by counting the number of candidate watchpoints in the subset that are included in the same call chain from the source program point to the sink program point. In one or more embodiments, the watchpoint engine derives approximated call chains from the execution trace. For example, due to the asynchronous nature of web applications, functions may be chained with callbacks. Continuing this example, a function may executed asynchronously, and a corresponding callback may be executed after the function itself has finished execution. However, it may be nontrivial to determine that the function and the callback are both in the same call chain because numerous operations may be executed in between the execution of the function and the callback. Furthermore, the registered callback may be different from the executed callback because callbacks may be wrapped and unwrapped prior to execution. Thus, as an approximation, the watchpoint engine may consider every callback registration to be chained with every executed callback.

The watchpoint engine may calculate the value of the performance metric for a subset of candidate watchpoints by counting the number of candidate watchpoints in the subset.

The objective function may combine the validity metric, and understandability metric, and performance metric in various ways. For example, the objective function may be primarily driven by the validity metric because the validity metric is directly based on transformations of the source value that result in the sink value. Continuing this example, the understandability metric and/or performance metric may be used to break a tie when two subsets of candidate watchpoints have the same value of the validity metric. Alternatively, the understandability metric and/or performance metric may be used to break a tie when two subsets of candidate watchpoints have values of the validity metric that are within a threshold value of each other. Still continuing this example, when two subsets of candidate watchpoints have the same value of the validity metric, the watchpoint engine may select the subset of candidate watchpoints corresponding to a larger value of the understandability metric (e.g., corresponding to more function calls in the same call chain). Alternatively, when two subsets of candidate watchpoints have the same value of the validity metric, the watchpoint engine may select the subset of candidate watchpoints corresponding to a smaller value of the performance metric (e.g., corresponding to fewer candidate watchpoints). As another example, the objective function may combine the validity metric, and understandability metric, and performance metric via a weighted average.

Otherwise, if Step 208 determines that no modified subset is an improvement to the selected subset, then in Step 212 the watchpoint engine presents the selected subset as a taint flow trace for the taint report. For example, if the pool of improved subsets is empty, then no modified subset is an improvement to the selected subset. If multiple taint flow traces have been generated as a result of searching the space of possible subsets of the candidate watchpoints (e.g., in multiple parallel and/or sequential executions of Step 206 above), then the watchpoint engine may apply the objective function to select an optimal solution from among the multiple taint flow traces, each representing a locally optimal solution to the watchpoint optimization problem.

The watchpoint engine may send the taint flow trace to the instrumenter to adjust how the application is instrumented to perform subsequent taint analyses. The instrumenter may then selectively instrument the application, in order to focus the taint analysis on those modules of the application that include one or more inferred watchpoints included in the taint flow trace, in addition to those modules that include the taint configuration (e.g., taint sources, taint sinks, and sanitizer). For example, web applications may dynamically load numerous large modules (e.g., libraries), not all of which are relevant to a taint analysis. Excluding modules that are irrelevant to the taint analysis improves the performance of the taint analysis. Experimental results showed that selective instrumentation based on inferred watchpoints sped up the execution time of the taint analysis by a factor exceeding 2.5.

Figure 4A:
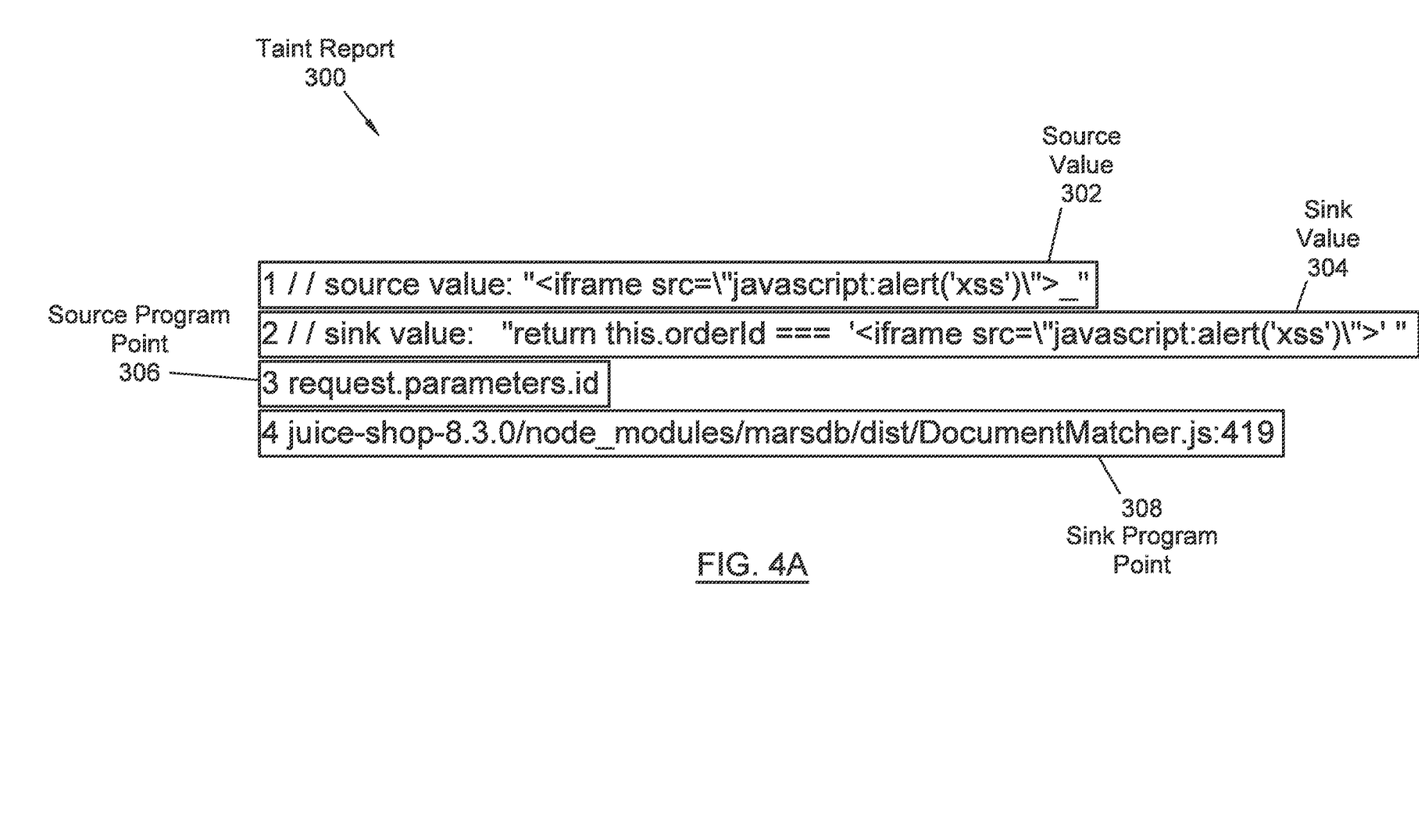
FIG. 4A, FIG. 4B, and FIG. 4C show examples in accordance with one or more embodiments of the invention.
Figure 4B:
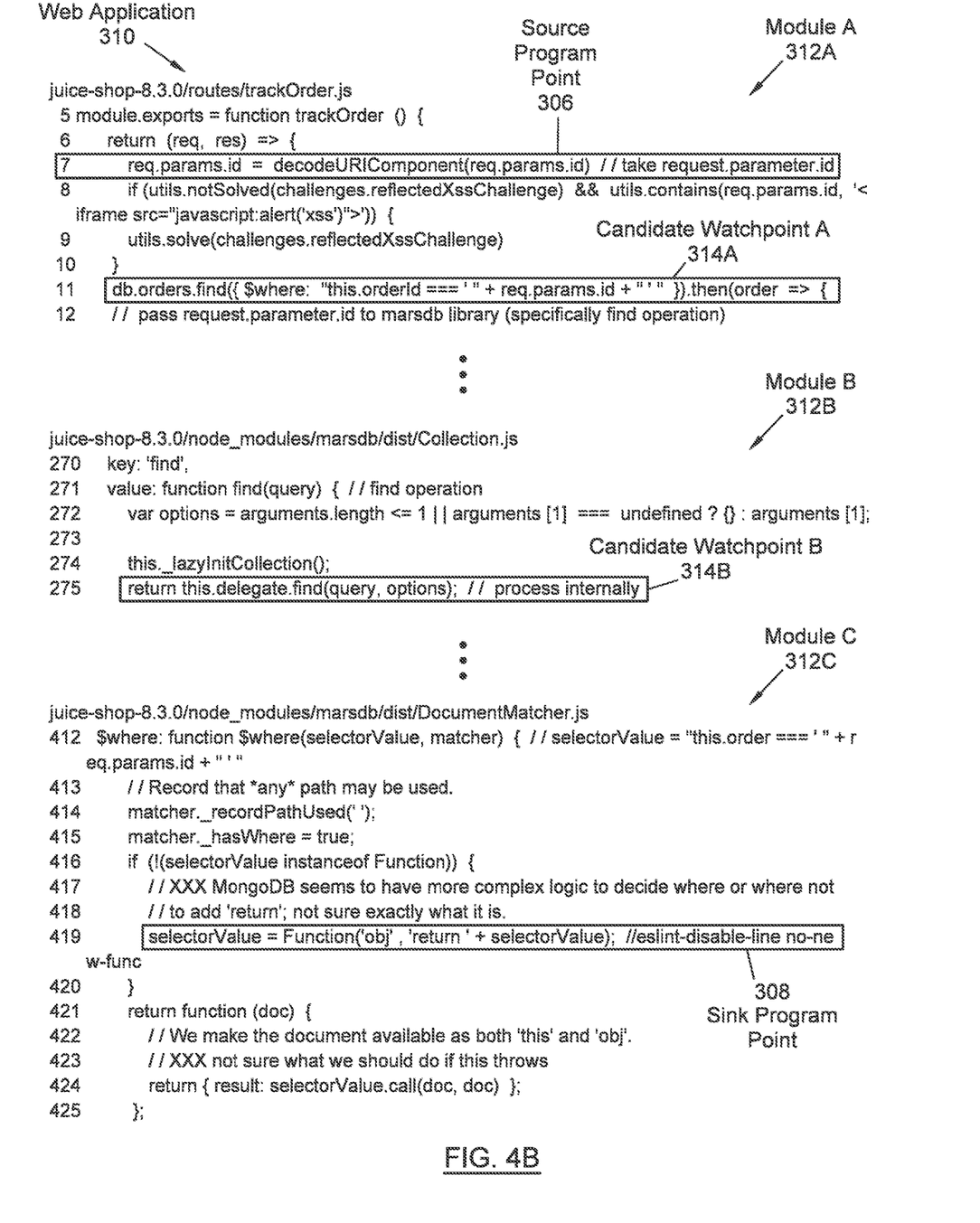
Figure 4C:
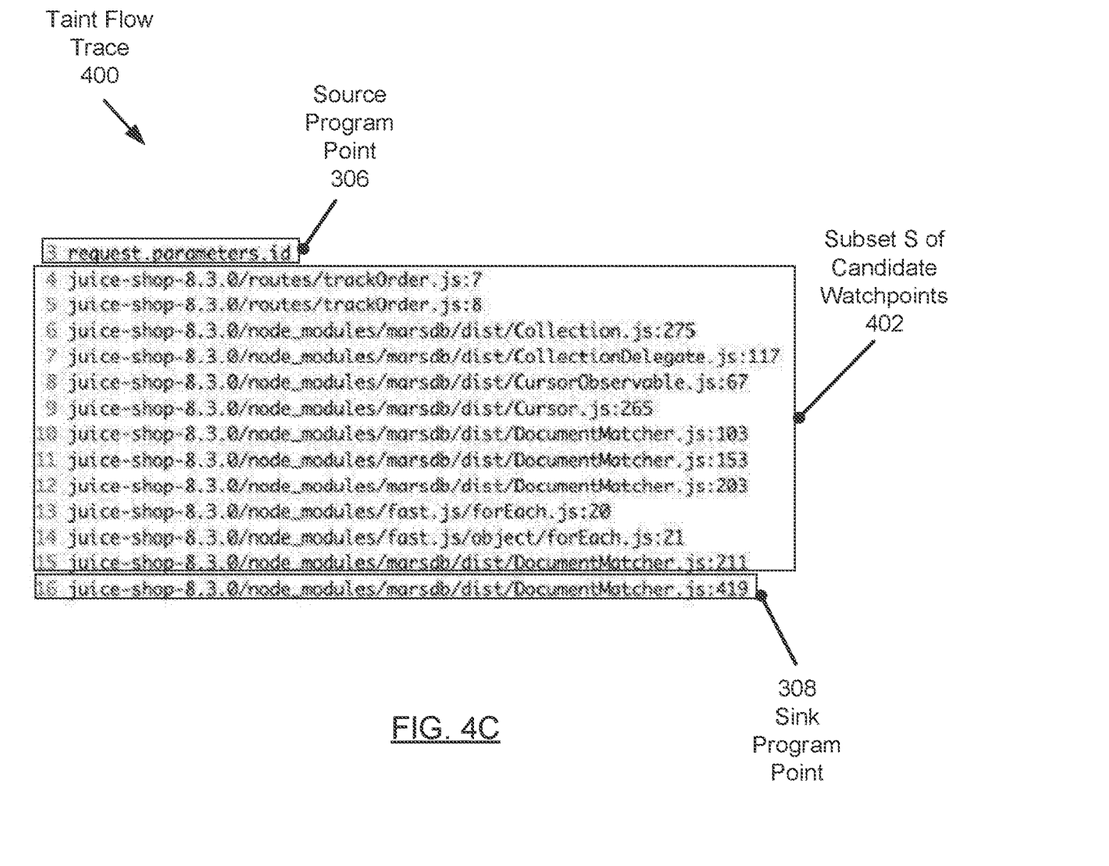

FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows a taint report (300) ((120) in FIG. 1) that represents a taint flow from a source value (302) ((124) in FIG. 1) received at a source program point (306) ((122) in FIG. 1) of a web application to a sink value (304) ((128) in FIG. 1) received at a sink program point (308) ((126) in FIG. 1) of the web application. The source program point (306) is the "id" parameter of a HyperText Transfer Protocol (HTTP) request received by the web application. The source value (302) is the value of the "id" parameter of the HTTP request received by the web application. However, the taint report (300) does not show how the source value (302) flows to the sink value (304).

FIG. 4B shows a web application (310) ((108) in FIG. 1) that includes modules (312A, 312B, 312C) ((110M, 110P) in FIG. 1). Module A (312A) includes the source program point (306), where the request parameter "id" is consumed by the web application (310). Module A (312A) also includes candidate watchpoint A (314A) ((132F, 132J) in FIG. 1) which passes the source value (302) as part of a string to the "find" operation of Module B (312B). Thus, the string passed to the "find" operation at candidate watchpoint A (314A) is a taint-like value that is similar to the source value (302). Candidate watchpoint B (314B) returns the string that includes the source value (302) to another module in the web application (310). Module C (312C) includes the sink program point (308) where the string (i.e., the taint-like value) that includes the source value (302) is passed to a function object as a part of "selectorValue", and executed. Attackers may exploit the execution of the string by crafting the source value (302) passed in at the source program point (306).

Initially, the watchpoint engine receives the taint report (300) and an execution trace from the web application (310), which executes at a web server. The web application (310) was previously instrumented by an instrumenter executing at the web server to generate the taint report (300) and the execution trace. The execution trace includes candidate watchpoints (e.g., candidate watchpoint A (314A) and candidate watchpoint B (314B)) with taint-like values similar to the source value (302).

Turning to FIG. 4C, after selecting and modifying various subsets of candidate watchpoints, the watchpoint engine determines that subset S of candidate watchpoints (402) is a solution to the watchpoint optimization problem for the taint report (300). That is, the watchpoint engine is unable to improve upon subset S of candidate watchpoints (402) ((144A, 144N) in FIG. 1 and FIG. 2), relative to the objective function. Thus, the watchpoint engine adds the subset S of candidate watchpoints (402) to a taint flow trace (400) ((142A, 142N) in FIG. 1 and FIG. 2) corresponding to the taint report (300). The taint flow trace (400) begins with the source program point (306), continues to subset S of candidate watchpoints (402), and ends with the sink program point (308).

Prior to determining that subset S of candidate watchpoints (402) was the solution to the watchpoint optimization problem, the watchpoint engine had rejected an alternate subset T of candidate watchpoints that removes candidate watchpoint B (314B) from subset S of candidate watchpoints (402). The watchpoint engine's rejection of subset T of candidate watchpoints was based on the following calculations:

1) the values of the validity metrics for subset S of candidate watchpoints (402) and subset T of candidate watchpoints are identical. That is, removing candidate watchpoint B (314B) did not increase either the maximum edit distance or the total edit distance of subset T of candidate watchpoints relative to subset S of candidate watchpoints (402).

2) the value of the performance metric for subset S of candidate watchpoints (402) is higher than the value of the performance metric for subset T of candidate watchpoints. That is, subset S of candidate watchpoints (402) includes one more candidate watchpoint than subset T of candidate watchpoints.

3) the value of the understandability metric for subset S of candidate watchpoints (402) is higher than the value of the understandability metric for subset T of candidate watchpoints. That is, subset S of candidate watchpoints (402) includes one more candidate watchpoint in a call chain than subset T of candidate watchpoints.

Because the values of the validity are identical, the watchpoint engine and the objective function used by the watchpoint engine assigns a higher priority to the understandability metric than to the performance metric, the watchpoint engine determines that subset S of candidate watchpoints (402) is a better solution to the watchpoint optimization problem than subset T of candidate watchpoints.

The watchpoint engine then sends the taint flow trace (400) to the web server. The instrumenter then limits subsequent taint analyses to load only the modules of the web application (310) that include subset S of candidate watchpoints (402), the source program point (306), or the sink program point (308).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
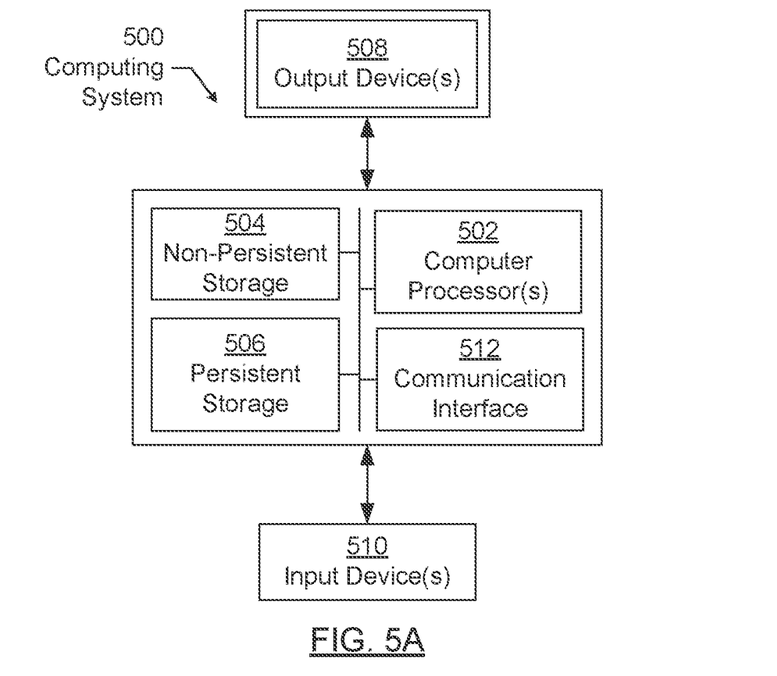
FIG. 5A and FIG. 5B show a flow diagram of computing systems in accordance with one or more embodiments of the invention.
Figure 5B:
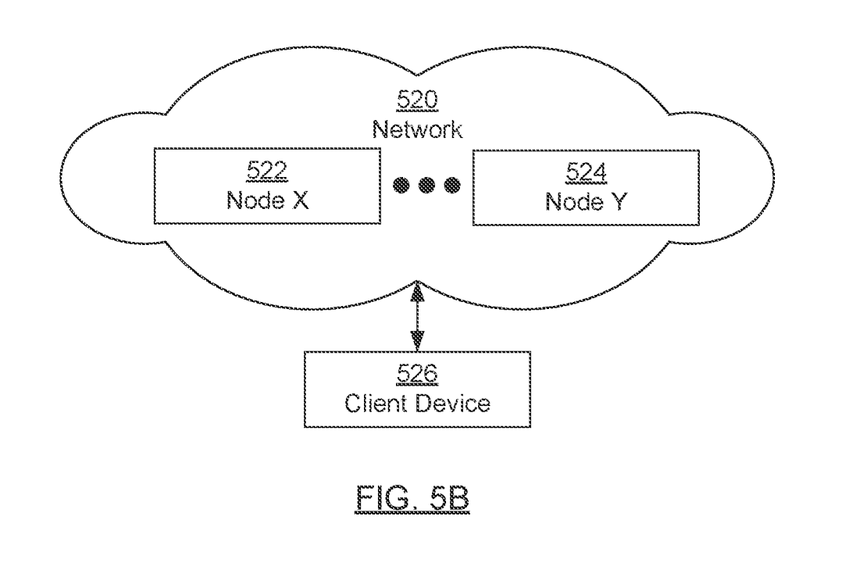

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, from an instrumented application executing on a web server: (i) a taint report comprising a source value and (ii) an execution trace comprising a plurality of candidate watchpoints that access taint-like values similar to the source value;
   deriving a call chain including at least one function and a corresponding callback from the execution trace;
   selecting a subset of the plurality of candidate watchpoints to obtain a first selected subset, wherein the first selected subset is arranged in a first sequence of candidate watchpoints;
   modifying the first selected subset to obtain a first modified subset of the plurality of candidate watchpoints, wherein the first modified subset is arranged in a second sequence of candidate watchpoints; and
   determining, by applying an objective function to the first selected subset and the first modified subset, that the first modified subset is an improvement to the first selected subset,
      wherein applying the objective function to the first selected subset comprises calculating a number of candidate watchpoints of the first sequence that are comprised by the call chain, and
      wherein applying the objective function to the first modified subset comprises calculating a number of candidate watchpoints of the second sequence that are comprised by the call chain.

2. The method of claim 1,
   wherein the instrumented application comprises a plurality of modules, and
   wherein the instrumented application generates the taint report by performing a taint analysis, the method further comprising:
      identifying a first subset of the plurality of modules that comprise a candidate watchpoint of the first modified subset;
      identifying a second subset of the plurality of modules that comprise a program point corresponding to a taint configuration; and
      further instrumenting the instrumented application to limit the taint analysis to the first subset of the plurality of modules and the second subset of the plurality of modules.

3. The method of claim 1, further comprising:
   in response to determining that the first modified subset is an improvement to the first selected subset, selecting the first modified subset of the plurality of candidate watchpoints to obtain a second selected subset;
   modifying the second selected subset to obtain a second modified subset of the plurality of candidate watchpoints;
   determining, by applying the objective function to the second selected subset and the second modified subset, that the second modified subset is not an improvement to the second selected subset; and
   in response to determining that the second modified subset is not an improvement to the second selected subset, presenting the second selected subset as a taint flow trace for the taint report.

4. The method of claim 1,
   wherein applying the objective function to the first selected subset comprises:
      calculating a maximum edit distance between consecutive candidate watchpoints in the first sequence, and
      calculating a total edit distance for the first sequence, and
   wherein applying the objective function to the first modified subset comprises:
      calculating a maximum edit distance between consecutive candidate watchpoints in the second sequence, and
      calculating a total edit distance for the second sequence.

5. The method of claim 1, wherein modifying the first selected subset of the plurality of candidate watchpoints is one selected from a group consisting of adding a candidate watchpoint of the plurality of candidate watchpoints to the first selected subset, and removing a candidate watchpoint of the plurality of candidate watchpoints from the first selected subset.

6. The method of claim 1, further comprising determining that one of the plurality of candidate watchpoints accesses a taint-like value similar to the source value by determining that the taint-like value is within a threshold edit distance of the source value.

7. The method of claim 1,
   wherein the execution trace corresponds to a request received by the instrumented application, and
   wherein the plurality of candidate watchpoints correspond to the request.

8. A system comprising:
   a computer processor;
   an instrumenter executing on a web server and configured to instrument an application to generate (i) a taint report comprising a source value and (ii) an execution trace comprising a plurality of candidate watchpoints that access taint-like values similar to the source value;
   a repository configured to store an objective function and a subset of the plurality of candidate watchpoints; and
   a watchpoint engine, executing on the computer processor and configured to:
      receive, from the instrumented application, the taint report and the execution trace,
      derive a call chain including at least one function and a corresponding callback from the execution trace,
      select the subset to obtain a first selected subset, wherein the first selected subset is arranged in a first sequence of candidate watchpoints,
      modify the first selected subset to obtain a first modified subset of the plurality of candidate watchpoints, wherein the first modified subset is arranged in a second sequence of candidate watchpoints, and
      determine, by applying the objective function to the first selected subset and the first modified subset, that the first modified subset is an improvement to the first selected subset,
         wherein applying the objective function to the first selected subset comprises calculating a number of candidate watchpoints of the first sequence that are comprised by the call chain, and
         wherein applying the objective function to the first modified subset comprises calculating a number of candidate watchpoints of the second sequence that are comprised by the call chain.

9. The system of claim 8, wherein the instrumented application comprises a plurality of modules, wherein the instrumented application generates the taint report by performing a taint analysis, and wherein the instrumenter is further configured to:
identify a first subset of the plurality of modules that comprise a candidate watchpoint of the first modified subset,
identify a second subset of the plurality of modules that comprise a program point corresponding to a taint configuration, and
further instrument the instrumented application to limit the taint analysis to the first subset of the plurality of modules and the second subset of the plurality of modules.

10. The system of claim 8, wherein the watchpoint engine is further configured to:
in response to determining that the first modified subset is an improvement to the first selected subset, select the first modified subset of the plurality of candidate watchpoints to obtain a second selected subset,
modify the second selected subset to obtain a second modified subset of the plurality of candidate watchpoints,
determine, by applying the objective function to the second selected subset and the second modified subset, that the second modified subset is not an improvement to the second selected subset, and
in response to determining that the second modified subset is not an improvement to the second selected subset, present the second selected subset as a taint flow trace for the taint report.

11. The system of claim 8,
wherein the watchpoint engine is further configured to apply the objective function to the first selected subset by:
calculating a maximum edit distance between consecutive candidate watchpoints in the first sequence, and
calculating a total edit distance for the first sequence, and
wherein the watchpoint engine is further configured to apply the objective function to the first modified subset by:
calculating a maximum edit distance between consecutive candidate watchpoints in the second sequence, and
calculating a total edit distance for the second sequence.

12. The system of claim 8, wherein the watchpoint engine is further configured to modify the first selected subset of the plurality of candidate watchpoints by selecting one from a group consisting of adding a candidate watchpoint of the plurality of candidate watchpoints to the first selected subset, and removing a candidate watchpoint of the plurality of candidate watchpoints from the first selected subset.

13. The system of claim 8, wherein the watchpoint engine is further configured to determine that one of the plurality of candidate watchpoints accesses a taint-like value similar to the source value by determining that the taint-like value is within a threshold edit distance of the source value.

14. A non-transitory computer readable medium comprising instructions that, when executed by a computer processor, perform operations comprising:
receiving, from an instrumented application executing on a web server, (i) a taint report comprising a source value and (ii) an execution trace comprising a plurality of candidate watchpoints that access taint-like values similar to the source value;
deriving a call chain including at least one function and a corresponding callback from the execution trace;
selecting a subset of the plurality of candidate watchpoints to obtain a first selected subset wherein the first selected subset is arranged in a first sequence of candidate watchpoints;
modifying the first selected subset to obtain a first modified subset of the plurality of candidate watchpoints, wherein the first modified subset is arranged in a second sequence of candidate watchpoints; and
determining, by applying an objective function to the first selected subset and the first modified subset, that the first modified subset is an improvement to the first selected subset,
wherein applying the objective function to the first selected subset comprises calculating a number of candidate watchpoints of the first sequence that are comprised by the call chain, and
wherein applying the objective function to the first modified subset comprises calculating a number of candidate watchpoints of the second sequence that are comprised by the call chain.

15. The non-transitory computer readable medium of claim 14,
wherein the instrumented application comprises a plurality of modules,
wherein the instrumented application generates the taint report by performing a taint analysis, and
wherein the instructions further perform:
identifying a first subset of the plurality of modules that comprise a candidate watchpoint of the first modified subset;
identifying a second subset of the plurality of modules that comprise a program point corresponding to a taint configuration; and
further instrumenting the instrumented application to limit the taint analysis to the first subset of the plurality of modules and the second subset of the plurality of modules.

16. The non-transitory computer readable medium of claim 14, wherein the instructions further perform:
in response to determining that the first modified subset is an improvement to the first selected subset, selecting the first modified subset of the plurality of candidate watchpoints to obtain a second selected subset;
modifying the second selected subset to obtain a second modified subset of the plurality of candidate watchpoints;
determining, by applying the objective function to the second selected subset and the second modified subset, that the second modified subset is not an improvement to the second selected subset; and
in response to determining that the second modified subset is not an improvement to the second selected subset, presenting the second selected subset as a taint flow trace for the taint report.

17. The non-transitory computer readable medium of claim 14,
wherein applying the objective function to the first selected subset comprises:
calculating a maximum edit distance between consecutive candidate watchpoints in the first sequence, and
calculating a total edit distance for the first sequence, and
wherein applying the objective function to the first modified subset comprises:

calculating a maximum edit distance between consecutive candidate watchpoints in the second sequence, and calculating a total edit distance for the second sequence.

\* \* \* \* \*

UNITED STATES PATENT AND TRADEMARK OFFICE
CERTIFICATE OF CORRECTION

PATENT NO. : 11,709,930 B2
APPLICATION NO. : 15/930162
DATED : July 25, 2023
INVENTOR(S) : Bae et al.

It is certified that error appears in the above-identified patent and that said Letters Patent is hereby corrected as shown below:

In the Claims

In Column 18, Line 4, in Claim 14, delete "subset" and insert -- subset, --, therefor.

Signed and Sealed this
Twenty-eighth Day of May, 2024

Katherine Kelly Vidal
*Director of the United States Patent and Trademark Office*